United States Patent
Lee

(10) Patent No.: US 7,746,840 B2
(45) Date of Patent: Jun. 29, 2010

(54) SIGNALING METHOD, SYSTEM, BASE STATION AND MOBILE STATION

(75) Inventor: Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 601 days.

(21) Appl. No.: 10/576,252

(22) PCT Filed: Sep. 29, 2004

(86) PCT No.: PCT/JP2004/014701
§ 371 (c)(1), (2), (4) Date: Apr. 14, 2006

(87) PCT Pub. No.: WO2005/039209
PCT Pub. Date: Apr. 28, 2005

(65) Prior Publication Data
US 2007/0076679 A1    Apr. 5, 2007

(30) Foreign Application Priority Data
Oct. 17, 2003   (JP) .............................. 2003-358461

(51) Int. Cl.
*H04B 7/212*    (2006.01)
(52) U.S. Cl. ................. 370/348; 455/450; 455/451; 455/403; 455/452.1; 455/452.2
(58) Field of Classification Search .............. 455/450, 455/451, 452.1, 452.2
See application file for complete search history.

(56) References Cited

U.S. PATENT DOCUMENTS
2002/0004379 A1 *  1/2002  Gruhl et al. .................. 455/403

FOREIGN PATENT DOCUMENTS

| | | |
|---|---|---|
| JP | 2000-244521 A | 9/2000 |
| JP | 2001-156784 A | 6/2001 |
| JP | 2002-520939 A | 7/2002 |
| JP | 2002-281545 A | 9/2002 |
| JP | 2003-8635 A | 1/2003 |
| JP | 2003-163687 A | 6/2003 |

OTHER PUBLICATIONS

TR25.896 V1.0.0, Feasibility Study for Enhanced Uplink for UTRA FDD.

* cited by examiner

*Primary Examiner*—Lester Kincaid
*Assistant Examiner*—Charles Shedrick
(74) *Attorney, Agent, or Firm*—Sughrue Mion, PLLC

(57) ABSTRACT

In a system for transmitting a plurality of data flows from a mobile station to a base station, combinations of capacities which are given from a radio network controller are optionally or quickly modified in the mobile station to be sent to the base station. The combinations of capacities are divided into a plurality of groups each of which is individually pointed by a sub pointer.

32 Claims, 12 Drawing Sheets

|  | FLOW 1 | FLOW 2 | FLOW 3 | TC |
|---|---|---|---|---|
| CC1 | 128 | 32 | 0 | 160 |
| CC2 | 64 | 32 | 8 | 96 |
| CC3 | 128 | 64 | 8 | 200 |
| CC4 (ALLOWED SUBSET OF CCs) | 64 | 0 | 0 | 64 |
| CC5 | 0 | 0 | 8 | 8 |

CAPACITY e.q. BIT RATE

|     | FLOW 1 | FLOW 2 | FLOW 3 | TC |
|-----|--------|--------|--------|-----|
| CC1 | 128    | 32     | 0      | 160 |
| CC2 | 64     | 32     | 8      | 96  |
| CC3 | 128    | 64     | 8      | 200 |
| CC4 | 64     | 0      | 0      | 64  |
| CC5 | 0      | 0      | 8      | 8   |

ALLOWED SUBSET OF CCs: CC3, CC4, CC5

CAPACITY e.q. BIT RATE

FIG. 1

|     | FLOW 1 | FLOW 2 | FLOW 3 | TC |
|-----|--------|--------|--------|-----|
| CC1 | 128    | 64     | 8      | 200 |
| CC2 | 128    | 32     | 0      | 160 |
| CC3 | 64     | 32     | 8      | 96  ← POINTER |
| CC4 | 64     | 0      | 0      | 64  |
| CC5 | 0      | 0      | 8      | 8   |

ALLOWED SUBSET OF CCs: CC3, CC4, CC5

FIG. 2 ing, a QoS
SIGNALING METHOD, SYSTEM, BASE STATION AND MOBILE STATION

This application claims priority from PCT Application No. PCT/JP2004/014701 filed Sep. 29, 2004 and from Japanese Application No. 2003-358461 filed Oct. 17, 2003, which applications are incorporated herein by reference.

TECHNICAL FIELD

The present invention relates to data packet transmission in mobile communication system, and more specifically, a closed-loop capacity scheduling for packet transmissions from a mobile station to a base station. The present invention also relates to an enhancement of Wideband Code Division Multiple Access (W-CDMA), namely Enhance Uplink Dedicated Channel (EDCH). The present invention also relates to provision of multiple Quality of Service (QoS) and multiple priority in data packet scheduling.

BACKGROUND ART

In WCDMA system, the uplink capacity is loosely managed in such a way that a mobile station can transmit up to a maximum rate that is controlled by a Radio Network Controller (RNC). The RNC based statistical multiplexing scheme would result in a high noise rise variation that leads to a loss of uplink capacity due to a large required noise rise headroom.

As a sister technology of HSDPA, a closed-loop-based uplink capacity scheduling between mobile station and base station is recently proposed in 3GPP. A reference is Non-Patent Publication 1 (3GPP TR25.896 v1.0.0 "Fesibility Sudy for Enhanced Uplink UTRA FDD" (2003-9)). In EDCH, a base station controls the maximum capacity of mobile station instead of RNC in such a way that the noise rise of cell is controlled in order to achieve smaller variance. The base station can react faster than RNC to the fast changing nature of wireless channel. Therefore the capacity scheduling at base station has a natural advantage over the RNC based WCDMA capacity scheduling. There are two kinds of scheduling schemes currently under investigation namely, 'Rate Scheduling' and 'Rate and Time Scheduling'.

In WCDMA system, the priority handling in uplink packet data transmission is such that a higher priority data packet is transmitted prior to lower priority data packet. Therefore a data packet with highest priority will be served up to maximum available transmission rate of mobile station, and if there is remaining rate, the next highest priority data packet can be transmitted. In addition to priority handling, a QoS handling was introduced in HSDPA, namely Guaranteed Bitrate (GBR). This is a kind of QoS-aware radio capacity scheduling in downlink packet transmission in such a way that the packet scheduler is aware of QoS requirement of data packet in addition to its priority to provide sufficient radio capacity to meet the required QoS of data packet.

In WCDMA system, a mobile station can assign uplink capacity for multiple data flows using a "set" of Combination of Capacities (CC). Each CC in the set indicates how a total capacity is divided into multiple flows while each CC may have different amount of total capacity TC in FIG. 1. Therefore, RNC can limit the total uplink transmission capacity by restricting mobile station to use only an allowed "sub-set" of CC. The required signaling is, then, an indication of the sub-set of CC from RNC to mobile station.

Similarly, in EDCH system, the base station can limit the total uplink transmission capacity by restricting mobile station to use only an allowed "sub-set" of CC. An efficient signaling technique, namely Pointer Handling, is proposed to reduce the overhead associated with the required signaling of the sub-set of CC between the base station and mobile station. This scheme requires the set of CC to be ordered with respect to the total amount of capacity. For example, the CC in FIG. 1 is ordered with respect to total capacity into FIG. 2. Then, the base station uses a differential signaling (i.e. +1 or −1) in signaling of the allowed sub-set of CC, e.g. at every beginning of capacity scheduling interval, a differential signaling is sent to all mobile stations in the cell. In addition, the mobile station can request to modify the allowed sub-set of CC, if it's allowed subset and cannot meet the priority and QoS of data flows. Then, a conventional differential signaling can be also used as request to modification of allowed sub-set of CC so that mobile station sends +1 or −1 if it requires higher or lower capacity. The differential signaling limits the overhead of signaling the allowed set of CC in order to conserve the uplink and downlink capacity for data transmission.

Despite of its spectral efficiency, the conventional differential signaling has a latency problem when it is applied to multiple data flows. In the example shown in FIG. 2, if the mobile station wants to reduce or increase the capacity allocated for a specific flow, then more than one differential signaling message is needed to be signaled. For example, if the current Pointer indicates CC3 and mobile station wants to increase the flow capacity of Flow 2 to 64 kbps, then two consecutive +1 signaling are needed and therefore the latency of capacity scheduling is increased. If the total size of the set of CC increases by introducing finer granularity of each flow, the latency will be also further increased so therefore the effectiveness of capacity scheduling is reduced.

The conventional differential signalling has a coupling problem when it is applied to multiple data flows. In the example shown in FIG. 2, if the current Pointer indicates CC3 and the mobile station wants to increase capacity of Flow 1 to 128 kbps while maintaining capacity of Flow 3 at 8 kbps, two consecutive +1 signaling are needed. After $1^{st}$ +1 signaling, Pointer indicates CC2 in which Flow 3 cannot transmit a data at all. This problem will be even more complicated if finer granularity for multiple flows is to be supported.

Handling of multiple priority and QoS of multiple flows is also a problem of differential signalling. If a flow is high priority and other flows are low priority flows, the latency of capacity change of high priority flow is delayed by granularity in low priority flows. For example in FIG. 2, if Flow 1 is high priority flow, in order to change a capacity, it requires two consecutive differential signaling. The problem becomes more complicated if the granularity of low priority is increased or total number of multiplexed flows is increased. There should be a mean to enable faster adaptation based on flow priority and associated QoS.

With reference to FIG. 3, consideration is given to a case in which a mobile station 1 and a mobile station 2 each have a plurality of flows having different priorities. In the mobile station 1, a flow 1a with high priority requests increase of the capacity, whereas a flow 1b with low priority requests reduction of the capacity. In the mobile station 2, a flow 2a with high priority requests reduction of the capacity, whereas a flow 2b with low priority requests increase of the capacity. According to the conventional differential signaling, each mobile station synthesizes the capacity requests of the plurality of flows into a single capacity request and reports this capacity request to the base station. Accordingly, in the example shown in FIG. 3, both the mobile station 1 and the mobile station 2 transmit a single capacity increase request. However, the base station cannot identify which flow of the mobile stations requests the increase of capacity. Therefore, it is impossible to preferentially allocate the capacity to the high-priority flow when the remaining capacity is not enough and the base station is only able to respond to the capacity increase request from one of the mobile stations. This induces a problem that the QoS achievement rate of the system as a whole is deteriorated.

DISCLOSURE OF THE INVENTION

According to a first aspect of this invention, a system or a method is for use in efficient uplink signaling to support closed loop capacity scheduling between a base station and a mobile station both of which carry out a plurality of data flows different in priority and QoS from one another. The mobile station assigning an uplink capacity for the data flows in accordance with the steps of:

preparing combinations of capacities concerned with combinations of the data flows;

modifying the combinations of the capacities into modified combinations of capacities; and determining the uplink capacity on the basis of the modified combinations of capacities.

The modifying step comprises the steps of:

dividing the flows with reference to the priority and QoS into a plurality of groups; and individually pointing the plurality of groups by sub pointers to obtain the modified combinations of capacities.

According to another aspect of this invention, a mobile station is for transmitting a plurality of data flows different in priority and QoS from one another. The mobile station comprises:

receiving means for receiving a capacity assignment message related to combinations of capacities concerned with the data flows;

modifying means for modifying the combinations of capacities into modified combinations of capacities; and transmitting means for transmitting a capacity request message related to the modified combinations of capacities in the form of a capacity request message frame.

According to still another aspect of this invention, a base station is co-operated with the mobile station mentioned above. The base station comprises:

forming means, responsive to the capacity request message, for forming a capacity assignment message including capacity assignment of the data flows; and transmitting means for transmitting the capacity assignment message to the mobile station.

The first benefit of the above-described "enhanced differential signaling" is the equal overhead to the conventional differential signaling. This conserves both downlink and uplink capacity in favor of data transmission rather than controlling overhead.

The second benefit of the above-described "enhanced differential signaling" is the decoupled capacity control among multiple flows. Conventional differential signaling as applied to the concept of a set of Combination of Capacities incurs the coupled capacity control in such a way that an individual flow capacity controls are coupled together so a change in a flow capacity would bring a undesirable change of flow capacity of other flows. By introducing the multiple Sub Pointers, this coupling is resolved.

The third benefit of the above-described "enhanced differential signaling" is the imbalanced bandwidth allocation scheme where a higher priority and more stringent QoS requirement flow sets can be allocated more signaling bandwidth than lower priority and less stringent QoS requirement.

The fourth benefit of the above-described "enhanced differential signaling" resides in enabling the base station to perform capacity scheduling taking priorities and QoSs in account among a plurality of mobile stations each having a plurality of flows, by introducing the differential signaling in the unlink. Accordingly, the QoS achievement rate of the system as a whole can be improved.

BRIEF DESCRIPTION OF THE DRAWING

FIG. 1 illustrates an example of Combination of Capacities in case of 3 data flows are multiplexed together.

FIG. 2 illustrates an Conventional Differential Signaling as applied to the case of 3 data flows are multiplexed together.

BEST MODE FOR CARRYING OUT THE INVENTION

Figure 3:
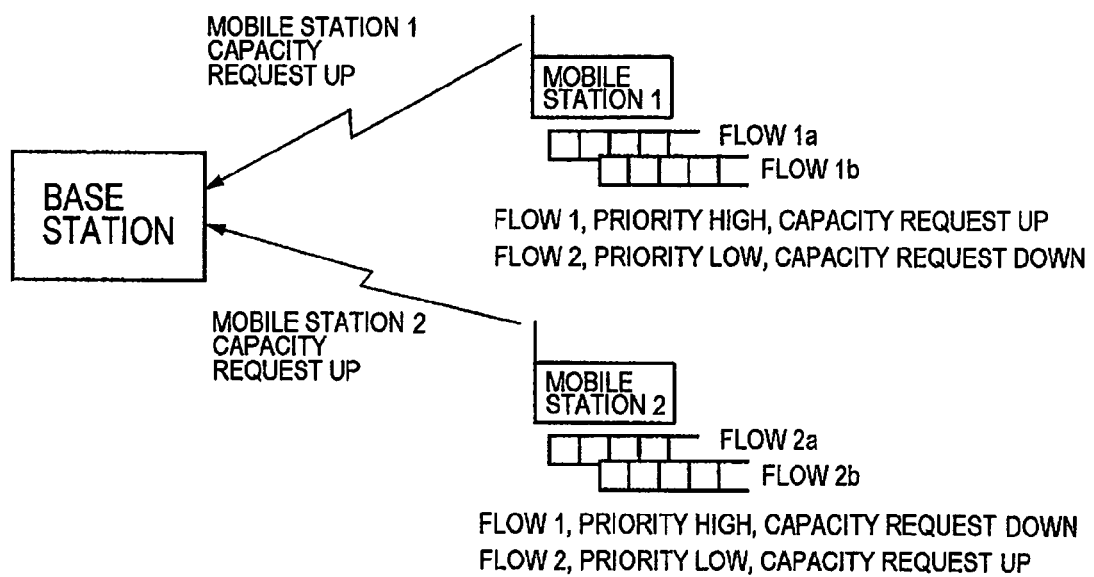
FIG. 3 is a system diagram for use in describing problems of the Conventional Differential Signaling.

Embodiments of the present invention will now be described in detail with reference to the drawing.

First Embodiment

A first embodiment of the present invention will be described in the first place.

Figure 4:
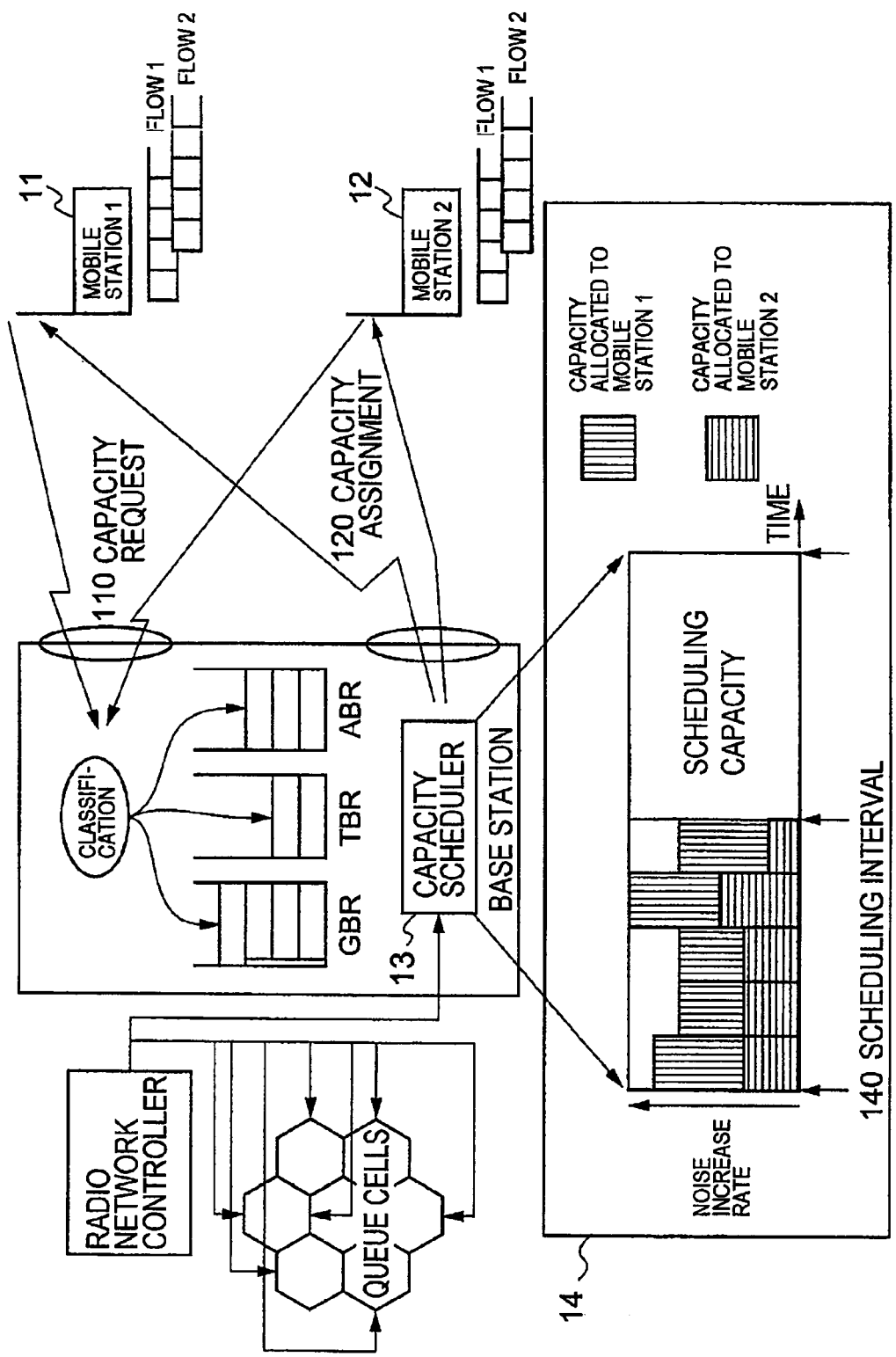
FIG. 4 is a diagram for use in describing a first embodiment of this invention and illustrates the communication between base station and a mobile station, the uplink capacity being controlled by scheduler taking into account of QoS of data flows.

The present invention includes a packet scheduling system providing multiple QoS and multiple priorities in uplink packet data transmission. As illustrated in FIG. 4, a base station 13 in FIG. 4 controls the uplink transmission capacity of mobile stations 11 and 12 in FIG. 4 in a cell by exchanging capacity request 110 in FIG. 4 in uplink and capacity assignment 120 in FIG. 4 in downlink.

Capacity scheduling 13 in FIG. 4 is that the transmission rate and transmission period of the mobile station transmitting data packet are controlled in order to efficiently share the uplink capacity (as shown by 14 in FIG. 4). Scheduling instance or interval (140 in FIG. 4) is the time when the decision of capacity scheduling is being made and the decision is valid until the next scheduling instance. The mobile stations transmit a portion of time within scheduling interval at an allowed transmission rate.

In the system illustrated in FIG. 4, each mobile station has multiple uplink data flows and each flow has a specific traffic class with QoS requirement and priority.

Examples of the traffic class are shown in FIG. 4, namely, Guaranteed Bitrate (GBR), Target Bitrate (TBR) and Available Bitrate (ABR). GBR and TBR are example traffic classes for streaming type of data service while ABR represents the best effort service. The flow priority can be used for user differentiation (e.g. business and home user) or data service differentiation (e.g. premium service or economic service). The multiple flows are multiplexed in such a way that more than one data flow can be active in order to provide simultaneous data service (e.g. simultaneous video streaming and file transfer).

Figure 5:
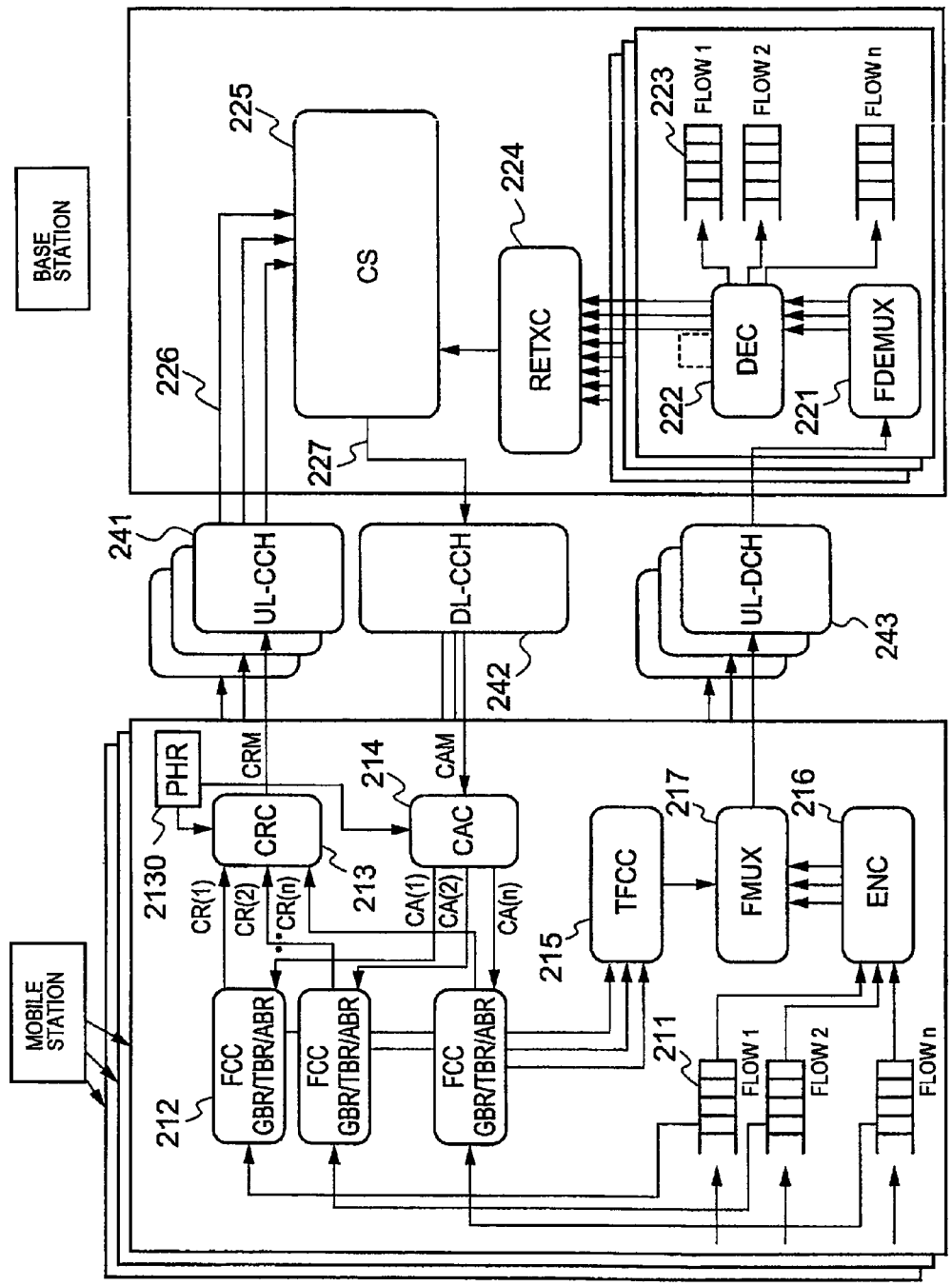
FIG. 5 is a system diagram for use in describing the first embodiment of this invention and is a schematic illustration of capacity scheduling for support of multiple QoS traffic class and priority handling.

FIG. 5 illustrates a detail system structure of the present invention which comprise multiple mobile stations and a base station. The entities which belong to the mobile station are a Flow Capacity Controller (FCC), a Capacity Request Controller (CRC), flow queues, a Transport Format Combination controller (TFCC), a flow multiplexer (FMUX) and encoder (Enc). The entities which belong to the base station are a Capacity Scheduler (CS), decoder (DEC), a Flow De-Multiplexer (FDEMUX) and Retransmission Controller (RETTX) and flow queues.

At the mobile station, an uplink data flow queue (211 in FIG. 5) stores the data packet to be sent on uplink. At the establishment of new data flow, a flow queue is associated to a Flow Capacity Controller (212 in FIG. 5) to which the radio network controller (RNC) signals QoS parameters, unique flow identification number and initial capacity. The FCC calculates the required uplink capacity of the associated data flow based on the required QoS of the flow and the flow buffer size. Then FCC includes a traffic class specific algorithm calculating a retransmission capacity, minimum QoS and excessive QoS capacities that are needed for next scheduling interval. The minimum QoS capacity is a needed capacity to fulfill the minimum QoS criteria while the excessive QoS capacity is a surplus capacity beyond the minimum QoS criteria. The CRC then calculates Capacity Request as a sum of retransmission, minimum QoS and excessive QoS capacities. The Capacity Requests calculated by FCC of all flows in the mobile station are then forwarded to Capacity Request Controller (213 in FIG. 5). The CRC examines the current available transmission power headroom (2130 in FIG. 5) and calculates a supportable total uplink capacity. If a sum of Capacity Requests of all flows is higher than the supportable uplink capacity, then the CRC reduces the excessive QoS portion of the Capacity Request starting from the lowest priority flow to the highest priority flow. If the sum of Capacity Requests without excessive QoS capacity is still larger than the supportable capacity, then CRC reduces the minimum QoS capacity portion of Capacity Request starting from the lowest priority flow to the highest priority flow. If still not sufficient, CRC reduces the retransmission capacity portion of Capacity Request starting from the lowest to highest priority flow. After CRC multiplexes the Capacity Request to form a Capacity Request Message, it transmits to the base station via uplink control channel.

At the beginning of each scheduling instance, the Capacity Scheduler at the base station (225 in FIG. 5) calculates both a non-schedulable and schedulable uplink capacity using a total received power in uplink. The Capacity Scheduler (CS) also calculates minimum transmission power headroom of each mobile in the cell using the reported transmission power headroom and the total received power in uplink. The minimum transmission power headroom indicates the maximum transmission power of the mobile station at next scheduling interval. The base station calculates a maximum supportable capacity of each mobile station at the assigned transmission power headroom. The Capacity Scheduler compares the maximum supportable capacity and a sum of Capacity Request, and if the former is larger than latter, the excessive QoS portion of the Capacity Request is reduced from the low priority flow to highest priority flow. If not sufficient, the minimum QoS portion of the Capacity Request is reduced from the lowest to highest priority flow. If not sufficient, the retransmission portion of the Capacity Request is reduced from the lowest to highest priority flow. The schedulable capacity is distributed to flows of all mobile stations using the flow information and the Capacity Request. The assigned capacity for each flow includes a retransmission capacity, minimum QoS capacity and excessive QoS capacity. The base station multiplexes the Capacity Assignment for each flow and transmit to the corresponding mobile station The Capacity Assignment Controller (214 in FIG. 5) in a mobile station receives the Capacity Assignment (CA) for its flows from the base station via downlink control channel. It also calculates a supportable uplink capacity using the available maximum transmission power. If a sum of received CA is higher than a supportable uplink capacity, then CAC reduces the excessive QoS portion of CA starting from lowest to highest priority flow. If not sufficient, CAC reduces the minimum QoS portion of CA starting from lowest to highest priority flow. If not sufficient, CAC reduces the retransmission portion of CA starting from lowest to highest priority flow.

At the mobile station, the uplink data transmission is performed in the following manner: the Transport Format Combination Controller (TFCC) (215 in FIG. 5) collects the assigned capacity for each data flow and then it calculates the transport format combination in such a way that each flow sends its data packets up to the allocated flow capacity. For each flow, the retransmission is allocated in prior to new data transmission and the rest of assigned capacity is used for new data transmission. Once TFC is chosen, the data packets from flow queues are encoded by the encoder 216 in FIG. 5 and multiplexed by the FMUX 217 in FIG. 5.

At the base station, the uplink data reception is performed in the following manner: The Flow De-multiplexer (FDEMUX) 221 separates the received bit streams into separate sub bit streams which are then separately decoded by the decoder (DEC) 222 in FIG. 5. The successfully decoded data packets are then stored into the respective flow queues 223. The DEC 222 reports the state of decoding of each data packets to Retransmission Controller (224 in FIG. 5) which then forwards the status to the uplink Capacity Scheduler(CS) 225. The base station reports the detection status to a corresponding mobile station and mobile station receives the transmitted status.

At the base station, the Capacity Request (CR) from mobile stations are received (226 in FIG. 5) and fed into the Capacity Scheduler (CS) 225. Then, the Capacity Assignment (CA) are generated by the CS 225 and transmitted to the mobile stations (227 in FIG. 5). At the uplink control channels (241 in FIG. 5), the CR are transmitted from the mobile stations to the base station. Each CR includes the required capacity for the flow and the FID. Preferably, the CR is encoded at the mobile station and decoded at the base station. At the downlink air interface (242 in FIG. 5), CA are transmitted from the base station to the mobile stations. Each CA includes the allowed capacity for the flows and the FID of the mobile station.

Figure 6:
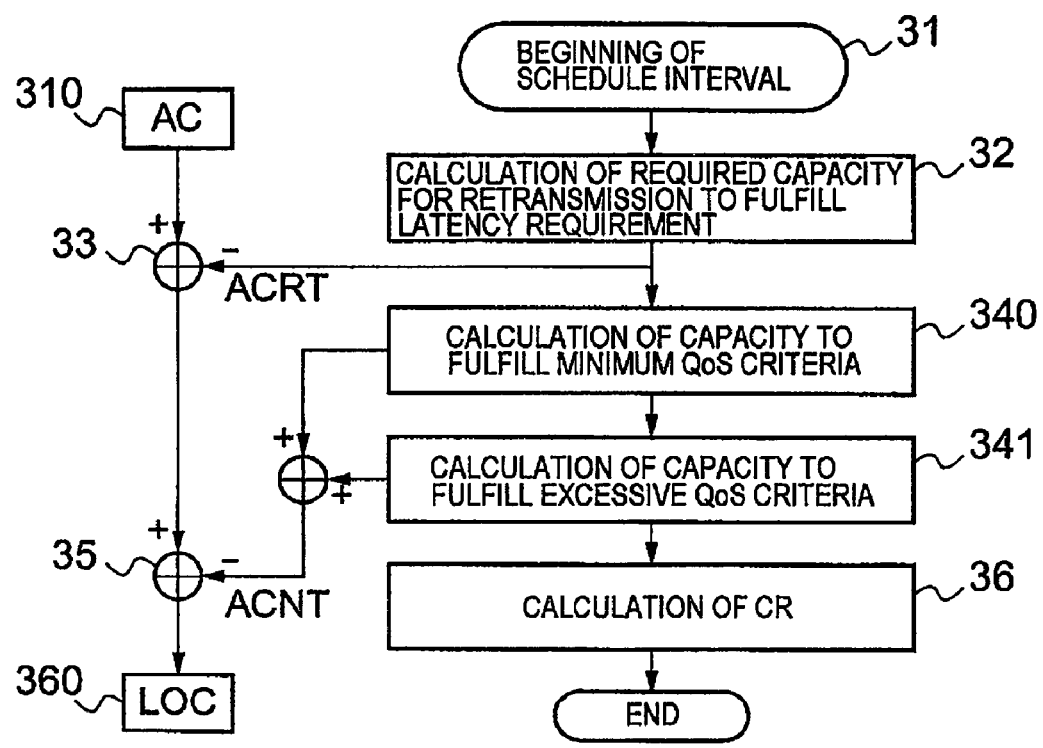
FIG. 6 is a flowchart for use in describing, the first embodiment of this invention and for explaining a general Flow Capacity Controller.

A generalized structure of Flow Capacity Controller is shown in FIG. 6. Although detail implementation of this controller is dependent on the traffic class of the flow, this figure illustrates an essential procedure common to all traffic class. The FCC is performed at least at the same period as the scheduling interval (31 in FIG. 6). The input parameters of FCC are the currently Assigned Capacity (AC) for the flow, a Required Capacity for Retransmission (RCR) and associated QoS parameters with the flow. Preferably, each traffic class has a unique set of QoS parameters. The output parameters of FCC are, then, Allocation Capacity for Retransmission (ACRT), Allocated Capacity for New Transmission (ACNT) and Capacity Request (CR). Firstly, FCC calculates the required capacity for retransmission to fulfill the packet data latency requirement (32 and 33 in FIG. 6). Preferably, the latency requirement is strict that FCC allocates as much as needed capacity to retransmission. Secondly, FCC calculates a required capacity for new data transmission containing both minimum QoS and excessive QoS capacity of the flow (340, 341 and 35 in FIG. 6). The Left-Over Capacity (LOL) (360 in FIG. 6) is the difference between AC and a sum of ACRT and ACNT. Finally, the CR is calculated whether more capacity is needed or not for next scheduling interval.

The GBR is a traffic class of which capacity is guaranteed up to a pre-defined level by the scheduler. The QoS parameters of GBR traffic class are the Maximum Capacity (MC) and the Guaranteed Capacity (GC). MC is the upper limit of allowable capacity while GC is the minimum guaranteed capacity. The scheduler may allocate more capacity than GC depending on availability of uplink capacity.

Figure 7:
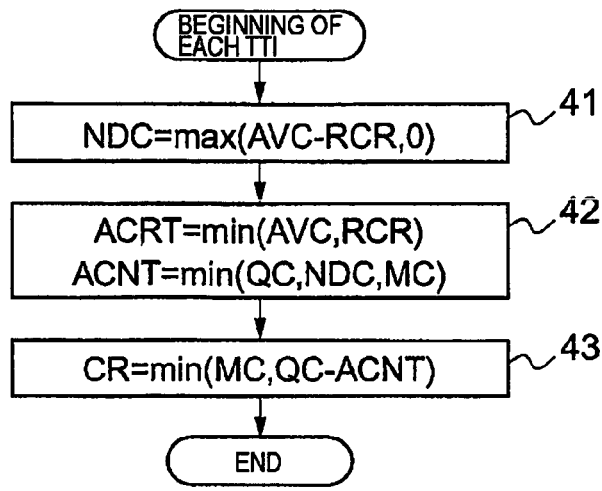
FIG. 7 is a flowchart for use in describing the first embodiment of this invention and is a flowchart of Flow Capacity Controller for GBR traffic class.

An implementation of FCC for GBR traffic class is illustrated in FIG. 7. Retransmission data has a higher priority than new transmission so the assigned capacity is firstly allocated to retransmission data and the remaining capacity is then allocated to new transmission data (at steps 41 and 42 in FIG. 7). For the allocation of new transmission, a QoS parameter of Maximum Capacity (MC) is used as an upper-limit whereas the lower limit is either current flow queue size (QC) or the assigned capacity (AC) for new transmission (NDC). It is clear that the Left-over Capacity (LOC) is positive only when NDC is larger than Maximum Capacity (MC) or QC is smaller than NDC. Finally a calculation of Capacity Request (CR) is carried out by comparisons between Maximum Capacity (MC) and residual flow queue size (QC-ACNT) (at step 43 in FIG. 7).

In case of FCC for GBR traffic class, the minimum QoS capacity is equal to GC while the excessive QoS is the difference between ARNT and GC.

ABR is a traffic class of which capacity is assigned depending on the availability of unused schedulable capacity at the base station. The QoS parameters of ABR traffic class are the Maximum Capacity (MC) and Minimum Capacity (MNC). MC is the upper limit of allowable capacity while MNC is an optional parameter specifying a minimum capacity to support timely transmission of small data packets such as TCP ACK.

vAn implementation of ABR FCC is equal to GBR FCC by setting the QoS parameter of guaranteed capacity (GC) equal to zero. The minimum QoS capacity is therefore equal to zero and all capacity allocated for this traffic class belongs to the excessive ()oS capacity. Preferably, the base station allocates at least a MNC for timely transmission of small data packets.

TBR is a traffic class of which capacity maintains at a target level. The QoS parameters of TBR traffic class are the Maximum Capacity (MC) and Target Capacity (TC). MC is the upper limit of allowable capacity while FCC controls an instantaneous capacity in order to meet an average capacity is equal to TC.

Figure 8:
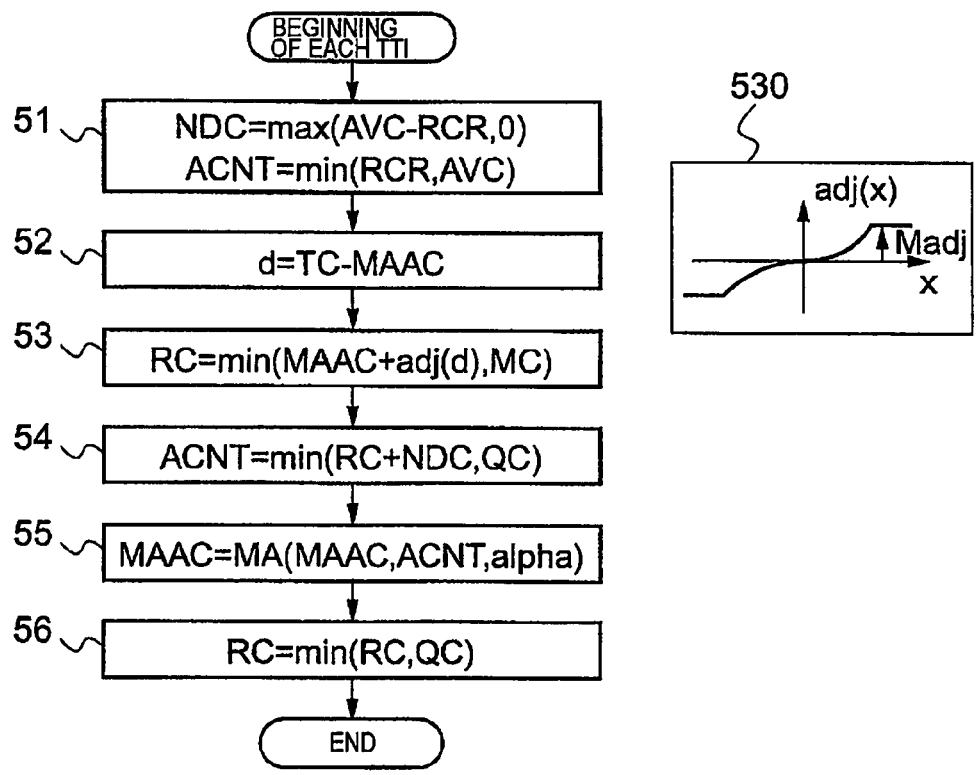
FIG. 8 is a flowchart for use in describing the first embodiment of this invention and is a flowchart of Flow Capacity Controller for TBR traffic class.

An implementation of TBR FCC is shown in FIG. 8. Retransmission data has a higher priority than new transmission so the assigned capacity is firstly allocated to retransmission data and the remaining assigned capacity is then allocated to new transmission data (at step 51 in FIG. 8). For the allocation of new transmission, firstly a gap or difference is calculated between a current moving average of allocated capacity (MAAC) and the TC (at step 52 in FIG. 8). Then, a required capacity to meet TC criteria is calculated using an adjustment (at steps 53 and 530 in FIG. 8). Then, capacity allocation is performed in such a way that the allocated capacity (ACNT) does not exceed both MC and queue size (QC) (at step 54 in FIG. 8). The MAAC is updated with moving average using newly calculated ACNT at step 55 in FIG. 8 and finally Capacity Request (CR) is calculated in order to achieve TC asymptotically (at step 56 in FIG. 8). In order to speed up the convergence rate, exponential type of adjustment function can be used (as shown by 530 in FIG. 8).

In case of FCC for TBR traffic class, the minimum QoS capacity is equal to the required capacity for new transmission (ACNT) while FCC does not request an excessive QoS.

In summary, the minimum QoS capacity of GBR, ABR and TBR are GC, 0 and the required capacity for new data transmission (ACNT) respectively. Also the excessive QoS capacity of GBR, ABR and TBR are ACNT-GC, ACNT and 0 respectively. From this comparison, ABR represents traffic class requesting mostly excessive QoS capacity while TBR represents traffic class requesting mostly minimum QoS capacity. GBR represents traffic class requesting both minimum QoS and excessive QoS capacities.

Figure 9:
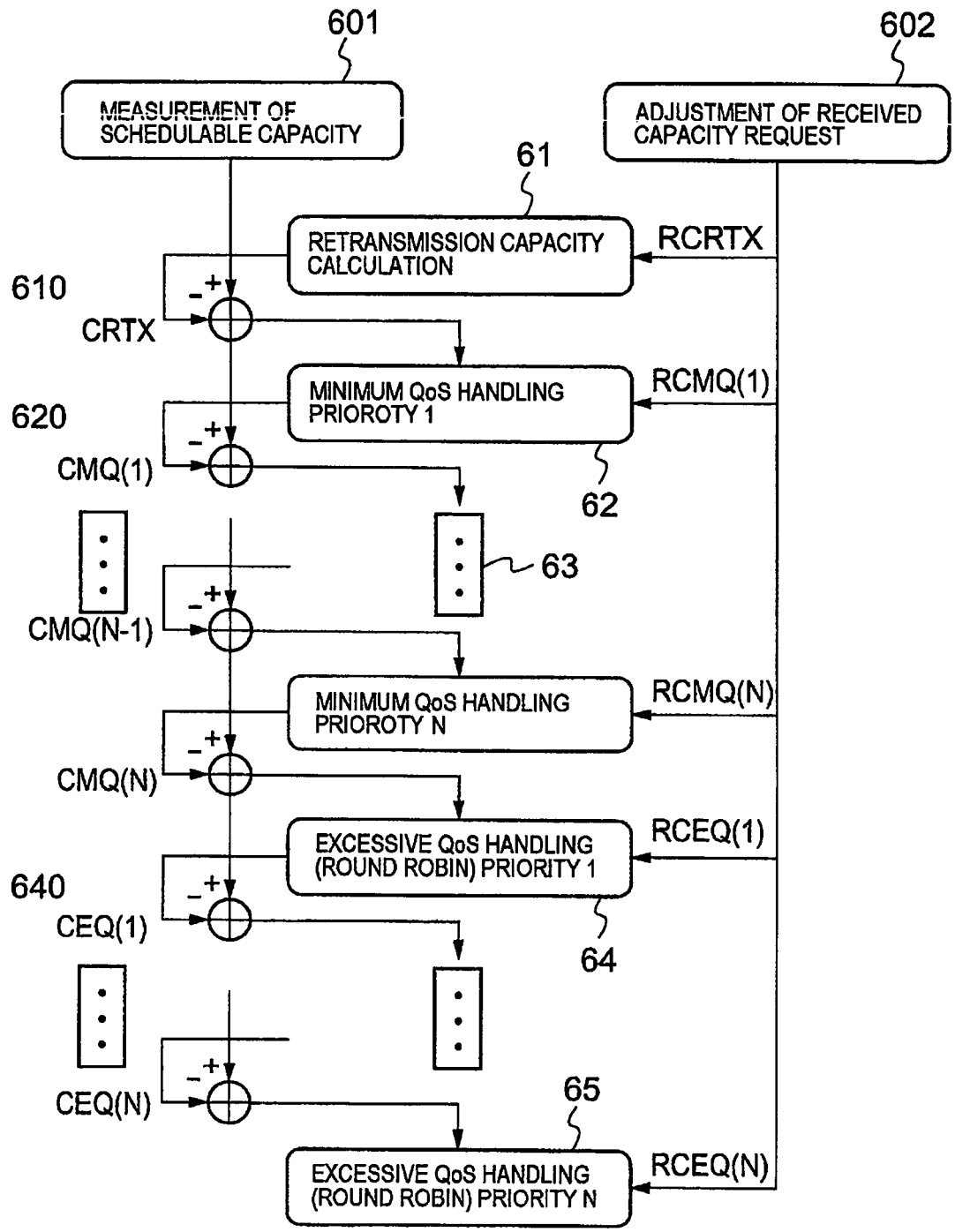
FIG. 9 is a flowchart for use in describing the first embodiment of this invention and is a flowchart illustration of Capacity Scheduler in which hierarchical capacity allocation is explained to support the multiple QoS and multiple priority flows.

An implementation of uplink capacity scheduler is shown in FIG. 9. At the beginning of scheduling interval, the base station measures the non-schedulable uplink capacity including component of the thermal noise, inter-cell interference and non-schedulable data transmission (601 in FIG. 9). The non-schedulable data transmission is a background load over which the scheduler has no control. Then CS calculates the available schedulable capacity as a difference between a maximum and the non-schedulable capacity.

Receiving upon the Capacity Request from mobile stations, the base station performs an adjustment of Capacity Request in what follows (620 in FIG. 9): The base station calculates a maximum supportable capacity for each mobile station after assigning minimum allowed transmission power headroom for each mobile station. The minimum transmission headroom controls the amount of interference to other cells in the network. The maximum supportable capacity at given minimum transmission headroom is compared with the total amount of required capacities. In order to meet the maximum supportable capacity to be larger than the total amount, the excessive QoS portion of the Capacity Request is reduced from the lowest to highest priority flow. If not sufficient, the minimum QoS portion of the Capacity Request is reduced from the lowest to highest priority flow; If not sufficient, the retransmission portion of the required capacity is reduced from the lowest to highest priority flow. The base station calculates the total amount of required retransmission capacity (RCRTX), minimum QoS capacity for each priority level (RCMQ(1), . . . , RCMQ(N)), excessive QoS capacity (RCEQ(1), . . . , RCEQ(N)) for all mobile stations. The base station also calculates, for each flow of each mobile station, a retransmission capacity, a minimum QoS and a excessive QoS capacity using the flow information and reported Capacity Request.

In order to maintain a total assigned capacity to be smaller than the total schedulable capacity, the base station assigns firstly the schedulable capacity to the retransmission capacity (61 in FIG. 9). If not sufficient for the total amount of required retransmission capacity, then the base station allocates retransmission capacity from highest to lowest flow. If sufficient, the base station assigns the remaining schedulable capacity to the minimum QoS capacity starting from flows in the highest priority (62 in FIG. 9) to the lowest priority (63 in FIG. 9). If sufficient, the base station assigns the remaining schedulable capacity to the excessive QoS capacity starting from flows in the highest priority (64 in FIG. 9) to the lowest priority (65 in FIG. 9). Between flows belonging to the same priority level, the capacity is distributed, preferably, in a fair scheduling manner. Finally, the base station calculates a total assigned capacity, for each flow of each mobile station, as a sum of assigned retransmission capacity, assigned minimum QoS and assigned excessive QoS capacity.

Figure 10:
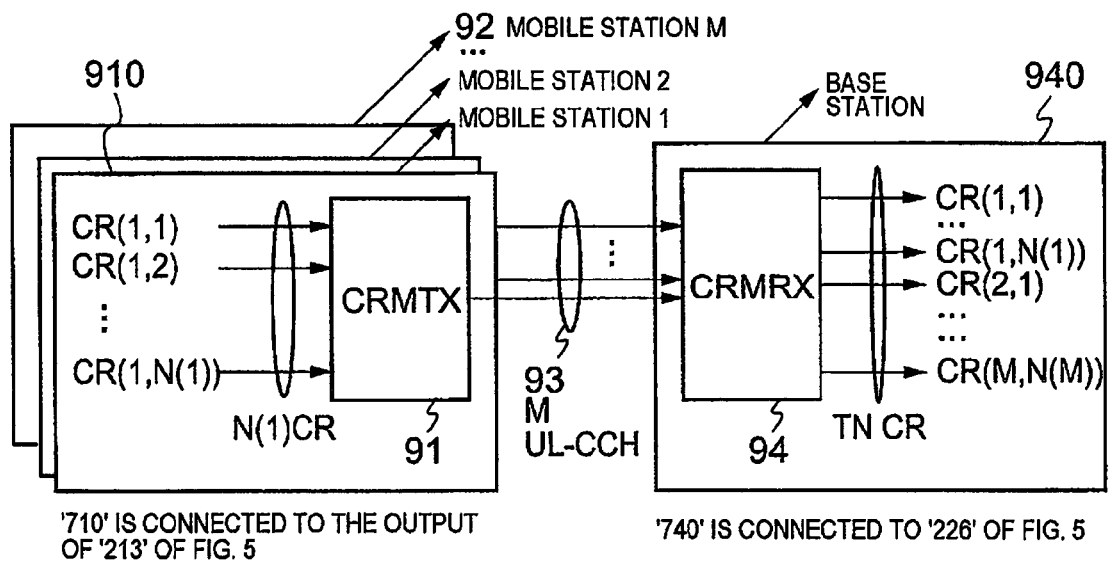
FIG. 10 is a diagram for use in describing the first embodiment of this invention and is a schematic of capacity request uplink control channel supporting multiple flow and multiple mobile station.

A schematic view of an "enhanced uplink different signalling" in uplink is shown in FIG. 10. There are M mobile stations (92 in FIG. 10) which establish a connection with a base station and the i-th mobile station has N(i) flows. A j-th flow of i-th mobile station sends Capacity Request CR(i,j) and there are N(i) number of CR for the i-th mobile station (910 in FIG. 10). Then, N(i) CR are sent to Capacity Request Message Transmitter (CRMTX) 91 (in FIG. 10) which formulates Capacity Request Message (CRM) and transmits a CRM via Uplink Control Channel (UL-CCH). Each mobile station sends one UL-CCH and the base station receives M UL-CCH (93 in FIG. 10). The Capacity Request Message Receiver (CRMRX) then calculates CR of multiple flows of the mobile station (94 in FIG. 10).

Figure 11:
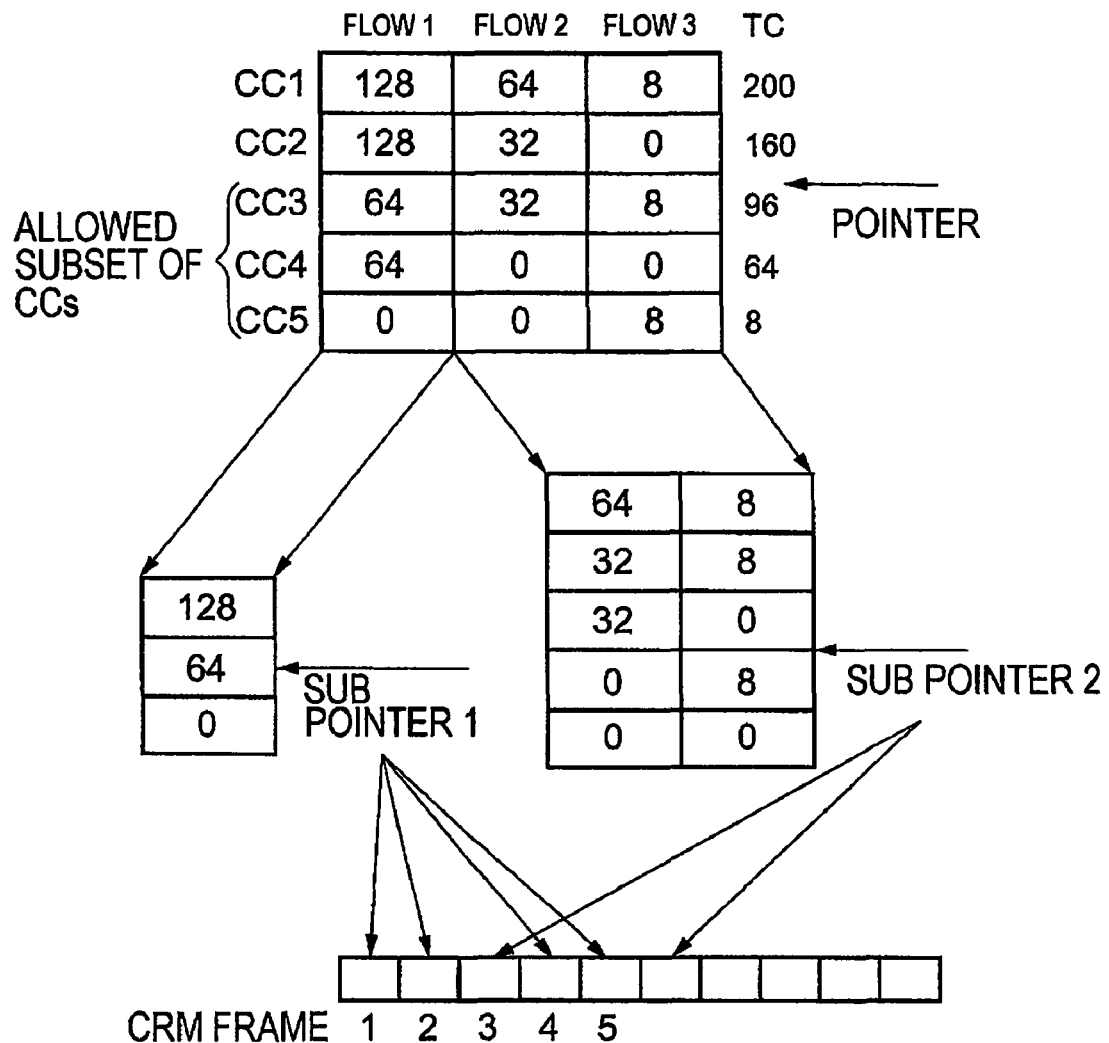
FIG. 11 is a diagram for use in describing the first embodiment of this invention and illustrates an example of Enhanced Differential Signaling as applied to the case of 3 data flows are multiplexed together.

In CRMTX, Capacity Requests of flows are examined and a closest Combination of Capacities (CC) is selected from a set of CC. Firstly, data flows are divided into several groups. Then, the sets of CC are divided into several subsets of CC corresponding to each group of data flows. Each subset contains unique CC of the data flows of the corresponding group. For example, FIG. 11 illustrates a case when 3 flows are divided into 2 groups, as shown in the middle part of FIG. 11. The sets of CC are also divided into 2 subsets of CC of respective set-size of 3 and 5. Secondly, there is a Sub Pointer corresponding to each subset of CC. The Sub Pointer is controlled by a capacity assignment message (CAM) transmitted by the base station.

Thirdly, a differential signalling is sent per Sub Pointer basis. Finally, the differential signalling of multiple Sub Pointers are sent in time division manner. For example, FIG. 11 illustrates differential signalling of $1^{st}$ and $2^{nd}$ Sub Pointer are sent twice and once at every three time slot.

The grouping of flows can be performed in such a way that high priority and low priority can be separated in order to decouple the interaction of combination of capacities aforementioned. For example, in example illustrated in FIG. 11, the change of capacity of $1^{st}$ flow has no impact on capacities of $2^{nd}$ and $3^{rd}$ flow. Therefore change of capacity of lower priority flow with less stringent QoS requirement does not interfere the higher priority flow with more stringent QoS requirement.

The mapping of differential signalling of multiple flows into a uplink control channel (UL-CCH) is carried out in a form of CRM Frame as shown in FIG. 11. This is based on a periodical transmission of differential signalling by associating the frame number with a group of flows. An example is given in FIG. 11 where 3 flows are sharing 1 UL-CCH channel in such a way that two out of every three frames are assigned to $1^{st}$ group of flows while $2^{nd}$ groups of flows is assigned for once in every three frames. A general principle is that frames are divided into a plurality of frequency slot which are then assigned to multiple groups of flows. By allocating more time slot for high priority and stringent QoS flow, it enables an imbalanced signalling bandwidth distribution among multiple flows with distinct priority and QoS.

As a result, the sub pointer 1 always indicates either one of 128, 64, and 0 of the first group while the sub pointer indicates one of 5 CC.

An example of Capacity Request Message (CRM) is shown in FIG. 11 in which 3 data flows are sharing CRM frame in a such way that two out of every three frames are assigned to $1^{st}$ group of flows while the flows in the $2^{nd}$ group is assigned once in every three frames. In this example, flow 1 which is high priority and QoS critical flow is allocated for 66% of bandwidth whereas flow 2 and flow 3 share 33% of bandwidth due to their low priority and less stringent QoS requirement.

Figures 12, 13:
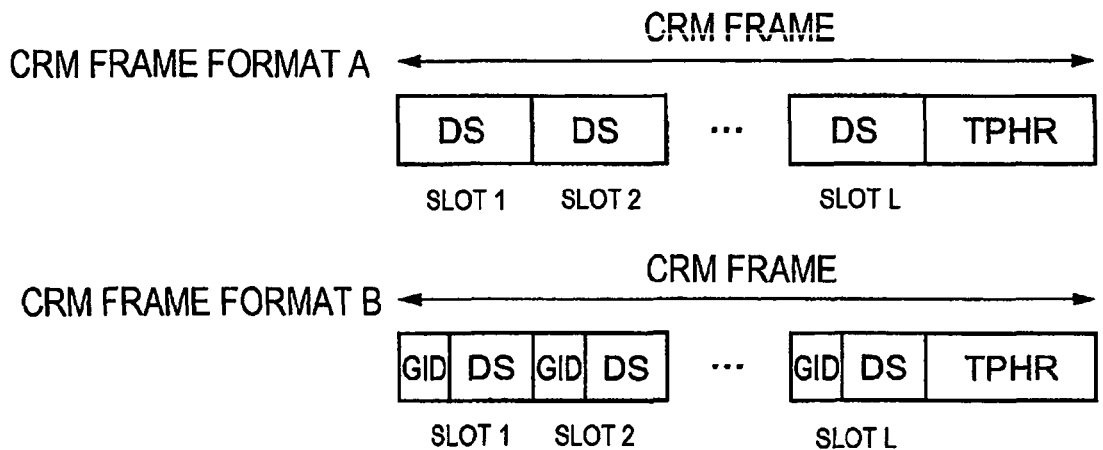
FIG. 12 is a diagram for use in describing the first embodiment of this invention and illustrates the frame formats of Capacity Request Message in uplink signaling.
FIG. 13 is a diagram for use in describing the first embodiment of this invention and illustrates an example of time evolution of uplink signaling using the CRM Frame Format A and B.

Two generic approaches of allocation of time slot of CRM are illustrated in FIG. 12. First approach is a periodical approach (Frame Format A); each CRM frame contains L Capacity Request (CR) slots and CRM frame has a periodicity of P frames. Therefore in total there are L*P CR channels can be allocated to the plurality of groups of data flows. More than one CR channel can be allocated for a group of-data flows. Second approach is a non-periodic one (Frame Format B); each CRM frame contains L CR slots but CRM frame has no periodicity. Because of non-periodicity, there is no predefined mapping between CR channel and a group of data flows. Therefore the Group ID is needed to be sent in addition to differential signalling. Preferably, the current available transmission power headroom of the mobile station (TX-PHR) is sent on each CRM.

More specifically, FIG. 12 shows two frame structures of CRM, namely, CRM Frame Format A and B. Both frame structure allows multiple slots for CR, per frame with transmission power headroom (TXPHR) attached at the end of frame. Frame Format A includes only CR while the "flow group" identification number (GID) is also added in case of Frame Format B.

CRM Frame Format A enables a periodical transmission of CR by associating the frame number with GID. An example is shown in c1 in FIG. 13. In the illustrated example, 4 flow groups (numbered from 1 to 4) are sharing 2 slots (first and second slots) in such a way that even and odd frame numbers of the first slot are assigned respectively to GID=1 and 2 while the second slot is assigned to GID=3 and 4. Specifically, GID=3 and 4 are assigned for three and one slot per every 4 frame , respectively.

A general principle is that a set of flows are assigned to a slot and the CR of set of flows are multiplexed into the slot in periodical manner. A maximum periodicity when N number of flows are multiplexed are k*N where k is an arbitrary integer number greater than 1. If k=1, then all flows share the slot with equal time portion while k>1 allows an un-equal time sharing between flows. In the example above, GID =1 and GID=2 share the slot 1 with equal time portion whereas GID=3 consumes three times more time portion of slot 2 than GID=4.

An enhancement of robustness of CRM Frame Format A is to use a repetition of CR so that base station can combine repeated slots to estimate the CR. The repetition factor is peculiar to each mobile.

A benefit of the CRM Frame Format A is that GID is not needed to be sent explicitly due to the pre-defined association or relationship of frame number and GID. This is effective to reduce the capacity overhead in transmitting CRM from multiple mobile stations. A shortcoming of the CRM Frame Format A is that a transmission delay of CR is caused to occur due to the periodical assignment of slot.

CRM Frame Format B enables explicit transmission of GID in addition to CR. An example is shown in c2 in FIG. 13 where 4 flows are sharing 2 slots in such a way that each flow can use a slot of a frame with a periodical reservation. A general principle is that, for every CRM, the mobile station decides L flows to be allowed to send its CR. Therefore, unlike Frame Format A, there is no fixed partitioning of time portion per flow.

An enhancement of robustness of Frame Format B is to use a repetition of CR so that base station can combine repeated slots to estimate the CR. The repetition factor is peculiar to each mobile (per mobile specific).

A benefit of the Frame Format B is that the transmission delay of CR can be reduced by an efficient slot assignment. However the overhead involved in transmitting explicit GID is a shortcoming of the Frame Format B.

Figure 14:
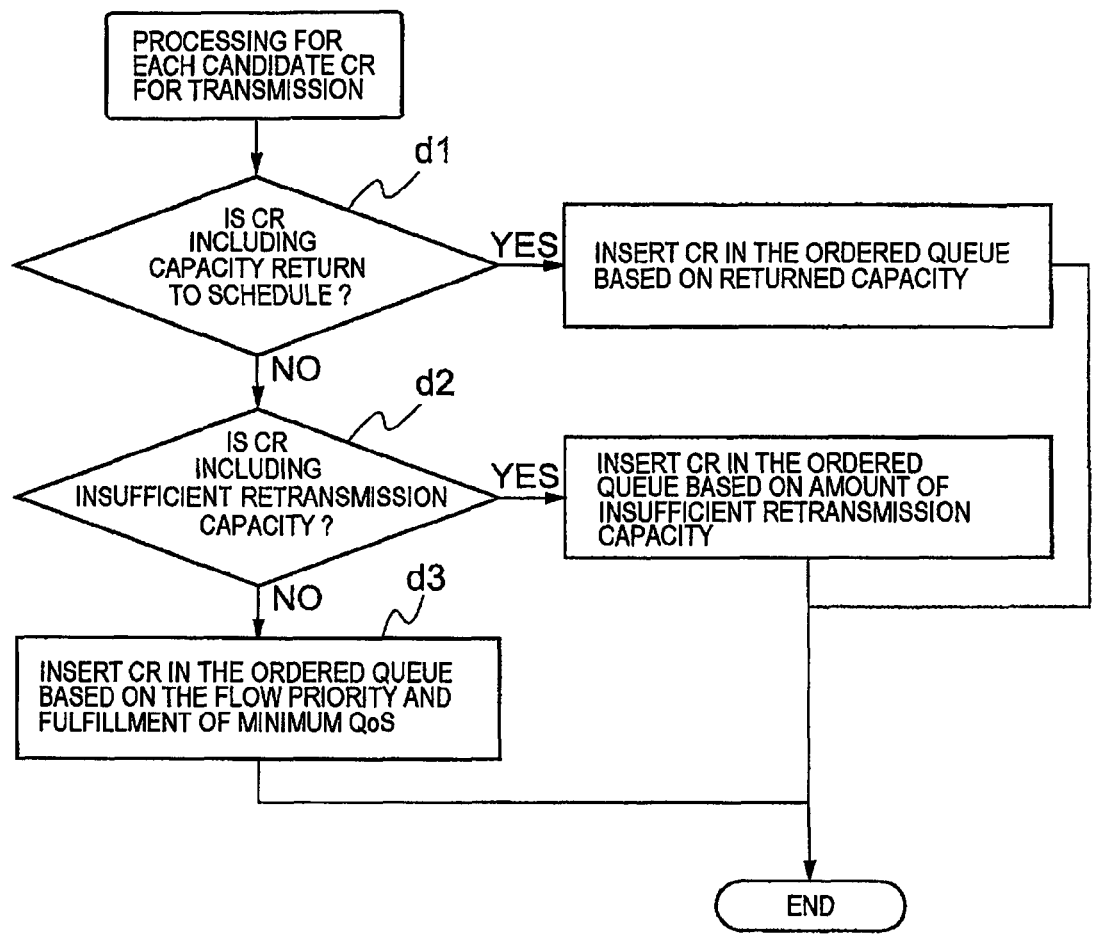
FIG. 14 is a diagram for use in describing the first embodiment of this invention and is a flowchart for use in describing CR selection procedure for CRM Frame Format B.

A CR selection scheme for Frame Format B is illustrated in FIG. 14. If there are a set of N flows that want to send CR, each CR will be tested against a set of criteria and arranged into an ordered set. From the ordered set of CR, the highest ordered L CR is selected for inclusion into CRM. The first criterion for the ordering is whether CR is to return the allocated capacity to Capacity Scheduler or not ('d1' in FIG. 14).

The criterion is the highest priority criterion in order to prevent the capacity from being locked away due to insufficient CRM slots. The second highest criterion for the ordering is whether CR is asking the capacity for retransmission or not. This is to prevent packet transmission delay due to insufficient CRM slots. The last criterion for the ordering is the priority of the flow and whether the minimum QoS is fulfilled or not. This serves to transmit CR in a higher priority flow prior to lower priority flow. And also the lower priority flow in violation of minimum QoS can send CR prior to higher priority flow in fulfillment of minimum QoS.

Second Embodiment

A second embodiment of the present invention will now be described.

Figure 15:
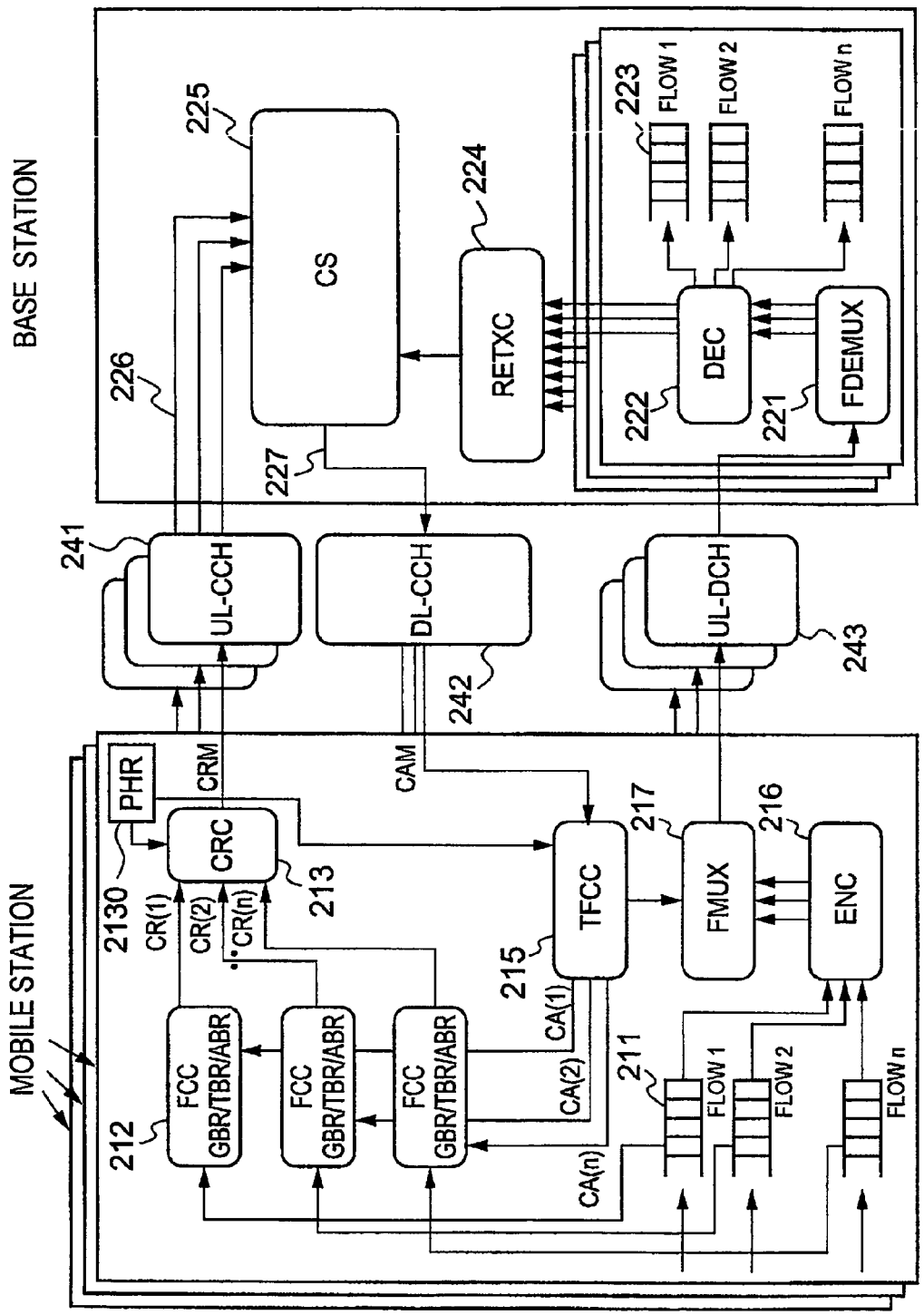
FIG. 15 is a system diagram for use in describing a second embodiment of this invention and is similar to FIG. 5.

FIG. 15 shows a system configuration having a plurality of mobile stations and a base station, and including uplink and downlink channels used in the second embodiment.

FIG. 15 is different from FIG. 5 illustrating the system configuration according to the first embodiment in that the CAC provided in FIG. 5 is not provided in FIG. 15. Instead, in the system configuration according to the second embodiment, a CAM transmitted from the base stations is received by a TFCC 215. The CAM indicates a total assignment capacity assigned to each mobile station, and the TFCC selects a combination of transport formats such that the capacity is smaller than the total assignment capacity and the power is lower than the maximum power of the mobile station. The TFCC determines the combination of transport formats so that the requested quality of a flow with higher priority is satisfied prior to the requested quality of a flow with lower priority. Thereafter, the TFCC transmits a TFCI indicating the selected combination of transport formats to the base station, while transmitting information relating to the selected combination of transport formats to FCCs.

Each FCC retrieves information on the capacity assigned to each data flow from the information on the selected combination of transport formats, and computes a requested uplink capacity of the data flow based on requested QoS of the flow to generate a capacity request (CR). The CR is then transmitted to a CRC, multiplexed by similar procedures to the first embodiment, and transmitted to a capacity scheduler (CS) in the base station as a capacity request message (CRM).

The CS according to the second embodiment computes an assignment capacity for each flow by similar procedures as of the CS according to the first embodiment described and illustrated in FIG. 9. The CS according to the second embodiment then computes a sum of the computed assignment capacities for the flows (total assignment capacity), and transmits a capacity assignment message (CAM) indicating the total assignment capacity to the mobile station through the down link.

The second embodiment is different from the first embodiment in the respects described above, while is similar to the first embodiment in the other respects. Therefore, the description thereof will be omitted here.

The following is description of the reference numerals used in the description above.
 11: Mobile Station 1
 12: Mobile Station 2
 13: Capacity Scheduler at the base station
 14: Capacity Scheduling (Example)
 211: Flow Queue at mobile station
 212: FCC (Flow Capacity Controller)
 213: CRC (Capacity Request Controller)
 2130: PHR (transmission Power Headroom)
 214: CAC (Capacity Assignment Controller)
 215: TFCC (Transport Format Combination Controller)
 216: ENC (Encoder)
 217: FMUX (Flow Multiplexer)
 221: FDEMUX (Flow De-multiplexer)
 222: DEC (Decoder)
 223: Flow Queue at base station
 224: RETTX (Retransmission Controller)
 225: CS (Capacity Scheduler)
 226: Received Capacity Request
 227: Capacity Assignment
 241: UL-CCH (Uplink Control Channel)
 242: DL-CCH (Downlink Control Channel)
 243: UL-DCH (Uplink Data Channel)
 310: AC (Assigned Capacity)
 33: ACRT (Allocated Capacity for Retransmission)
 35: ACNT (Allocated Capacity for New Transmission)
 36: CR (Capacity Request)
 360: LOC (Left Over Capacity)
 41: NDC (New Data Capacity), AC (Currently Assigned Capacity for the flow), RCR (Required Capacity for Retransmission)
 42: ACRT (Allocated Capacity for Retransmission), ACNT (Allocated Capacity for New Transmission), QC (Current Queue Buffer Size), MC (Maximum Capacity)
 43: CR (Capacity Request)

51: NDC (New Data Capacity), AC (Currently Assigned Capacity for the flow), RCR (Required Capacity for Retransmission), ACRT (Allocated Capacity for Retransmission)

52: TC (Target Capacity), MAAC (Moving Average of instantaneous Capacity)

53: RC (Required Capacity to achieve TC), MC (Maximum Capacity)

530: Adj(x) (Adjustment function), Madj (Maximum Adjustment)

54: ACNT (Allocated Capacity for New Transmission), QC (Current Queue Buffer Size)

55: Moving Average function (MA(x,d,a) where $x(n)=a*x(n-1)+(1-a)*d$), alpha (moving average coefficient)

56: CR (Capacity Request)

610: Total allocated capacity for retransmission

620: Total allocated capacity for minimum QoS of highest priority flows.

640: Total allocated capacity for excessive QoS of highest priority flows.

ABR: Available Bit Rate
BE: Best Effort
CR: uplink Capacity Request
CA: uplink Capacity Assignment
GBR: Guaranteed Bit Rate
TBR: Target Bit Rate
QoS: Quality of Service
RNC: Radio Network Controller
WCDMA: Wideband Code Division Multiplexing

The invention claimed is:

1. A system for efficient uplink signaling to support closed loop capacity scheduling between a base station and a mobile station both of which carry out a plurality of data flows different in priority and QoS from one another,
the mobile station assigning an uplink capacity for the data flows in accordance with the steps of:
preparing combinations of capacities concerned with combinations of the data flows;
modifying the combinations of the capacities into modified combinations of capacities; and
determining the uplink capacity on the basis of the modified combinations of capacities, wherein the modifying step comprises the steps of:
dividing the data flows with reference to the priority and QoS into a plurality of groups; and
individually pointing to the plurality of groups by sub pointers to obtain the modified combinations of capacities.

2. A system as claimed in claim 1, wherein the dividing step includes dividing the data flows into a first group of a high priority and a second group of a low priority.

3. A system as claimed in claim 2, wherein the steps further comprises the step of:
transmitting the representatives of the sub pointers by arranging them within a capacity request frame.

4. A system as claimed in claim 3, wherein the transmitting step comprises the step of:
periodically arranging the representatives of the sub pointers within the capacity request frame.

5. A system as claimed in claim 4, wherein the transmitting step comprises the step of:
a periodically arranging flow identifiers together with the representatives of the sub pointers within the capacity request frame.

6. A system as claimed in claim 1, further comprising the step of changing values indicated by the sub pointers based on capacity assignment information of which the base station informs the mobile station.

7. A system as claimed in claim 2, wherein the data flows having the high priority are grouped together into the first group and a first sub pointer is assigned to the first group and the data flows having the low priority are grouped together into the second group and a second sub pointer is assigned to the second group.

8. A system as claimed in claim 7, wherein the data flows are automatically grouped together according to a priority.

9. A system as claimed in claim 7, wherein a change of capacity of the first or second group does not impact a capacity of the other group.

10. A system as claimed in claim 2, wherein the dividing step includes grouping the data flows into a plurality of groups with reference to the priority and QoS of each data flow.

11. A system as claimed in claim 10, wherein the dividing step further includes dividing the plurality of groups into subsets of combinations of capacities, each subset of combinations of capacities having a set-size assigned thereto.

12. A system as claimed in claim 11, wherein each subset of combination of capacities has a sub pointer assigned thereto.

13. A system as claimed in claim 1, wherein each of the combination of capacities includes an uplink capacity for multiple data flows and indicates a distribution of how a total capacity is divided into the multiple data flows.

14. A system as claimed in claim 1, wherein the data flows are multiplexed together, and the multiplexed data flows are divided into the plurality of groups, each of the groups having a different sub pointer assigned thereto, and each sub pointer indicates one of the combination of capacities in a corresponding group to modify such that differential signaling is transmitted with respect to the indicated combination of capacities.

15. A system as claimed in claim 14, wherein the sub pointers indicate one of the combination of capacities in each of the corresponding groups simultaneously.

16. A system as claimed in claim 14, further including transmitting the differential signaling on a per sub pointer basis such that the differential signaling of multiple sub pointes are sent in a time division manner.

17. A method for efficient uplink signaling to support closed loop capacity scheduling between a base station and a mobile station both of which carry out a plurality of data flows different in priority and QoS from one another, the method comprising the steps of:
preparing, in the mobile station, combinations of capacities concerned with combinations of the data flows;
modifying, in the mobile station, the combinations of the capacities into modified combinations of capacities; and
determining an uplink capacity on the basis of the modified combinations of capacities in the mobile station,
wherein the modifying step comprises the steps of:
dividing the data flows with reference to the priority and QoS into a plurality of groups; and
individually pointing to the plurality of groups by sub pointers to obtain the modified combinations of capacities.

18. A method as claimed in claim 17, wherein the dividing step includes dividing the data flows into a first group of a high priority and a second group of a low priority.

19. A method as claimed in claim 18, wherein the steps further comprises the step of:
transmitting the representatives of the sub pointers by arranging them within a capacity request frame.

20. A system as claimed in claim 17, further comprising the step of changing values indicated by the sub pointers based on capacity assignment information of which the base station informs the mobile station.

21. A method as claimed in claim 19, wherein the transmitting step comprises the step of:
periodically arranging the representatives of the sub pointers within the capacity request frame, and the periodically arranging the representatives of the sub pointers includes transmitting differential signaling on a per sub pointer basis such that differential signaling of multiple sub pointes are sent in a time division manner.

22. A method as claimed in claim 17, wherein the data flows are multiplexed together, and the multiplexed data flows are divided into the plurality of groups, each of the groups having a different sub pointer assigned thereto, and each sub pointer indicates one of the combination of capacities in a corresponding group to modify such that differential signaling is transmitted with respect to the indicated combination of capacities.

23. A mobile station for transmitting a plurality of data flows different in priority and QoS from one another, comprising:
receiving means for receiving a capacity assignment message related to combinations of capacities concerned with the data flows;
modifying means for modifying the combinations of capacities into modified combinations of capacities; and
transmitting means for transmitting a capacity request message related to the modified combinations of capacities in the form of a capacity request message frame, wherein the modifying means divides the data flows with reference to the priority and QoS into a plurality of groups, and individually points to the plurality of groups by sub pointers to obtain the modified combinations of capacities.

24. A mobile station as claimed in claim 23, wherein the capacity request message frame includes two different choices of frames.

25. A base station co-operated with the mobile station claimed in claim 23 or 24, the base station comprising:
forming means, responsive to the capacity request message, for forming a capacity assignment message including capacity assignment of the data flows; and
transmitting means for transmitting the capacity assignment message to the mobile station.

26. A mobile station as claimed in claim 23, wherein the data flows are multiplexed together, and the modifying means divides the multiplexed data flows into the plurality of groups, each of the groups having a different sub pointer assigned thereto, and each sub pointer indicates one of the combination of capacities in a corresponding group to modify such that differential signaling is transmitted with respect to the indicated combination of capacities.

27. A method of control signal transmission for supporting a closed-loop capacity scheduling method used in a system comprising a mobile station capable of transmitting a plurality of data flows to a base station, any one of a plurality of priority levels being assigned to each of the data flows, wherein
the mobile station transmits to the base station a provisional scheduling information which is given by dividing the data flows into groups on the basis of the priority levels of each of the data flows, by individually pointing to each of the groups by sub pointers to obtain modified combinations of capacities and by producing the provisional scheduling information based on a buffer accumulation amount of the data flows of each group,
the base station determines an assigned capacity for the data flow on the basis of the provisional scheduling information,
the base station notifies to the mobile station the assigned capacity and information designating the data flow, and
the mobile station transmits the data flow on the basis of the received assigned capacity.

28. A method of control signal transmission as claimed in claim 27 wherein, on determining the assigned capacity, the base station carries out the steps of:
calculating a required capacity for each of the data flows from the provisional scheduling information, and
determining, in case where a total of the required capacity exceeds a usable capacity, an allowable capacity smaller than the required capacity on the basis of the priority level.

29. A method of control signal transmission as claimed in claim 27, wherein the assigned capacity notified from the base station to the mobile station comprises flow identification information of each of the data flows and an allowable capacity usable for the data flow.

30. A system for efficient uplink signaling to support closed loop capacity scheduling between a base station and a mobile station both of which carry out a plurality of data flows different in priority and QoS from one another,
the mobile station assigning an uplink capacity for the data flows in accordance with the steps of:
preparing combinations of capacities concerned with combinations of the data flows;
modifying the combinations of the capacities into modified combinations of capacities;
and
determining the uplink capacity on the basis of the modified combinations of capacities,
wherein the modifying step comprises the steps of:
dividing the data flows with reference to the priority and QoS into a plurality of groups; and
individually pointing the plurality of groups by sub pointers to obtain the modified combinations of capacities,
and
wherein the steps further comprises the step of:
transmitting the representatives of the sub pointers by arranging them within a capacity request frame, wherein the transmitting step comprises the step of:
periodically arranging the representatives of the sub pointers within the capacity request frame, wherein the periodically arranging the representatives of the sub pointers includes transmitting differential signaling on a per sub pointer basis such that differential signaling of multiple sub pointes are sent in a time division manner.

31. A system as claimed in claim 30, wherein the periodically arranging the representatives of the sub pointers further includes mapping differential signaling in a capacity request frame which is divided into a plurality of frequency slots and assigning each of the plurality of frequency slots to one of the groups of data flows in the time division manner.

32. A system as claimed in claim 31, wherein the assignment of the plurality of frequency slots is performed according to an imbalanced signaling bandwidth distribution among the data flows such that a larger number of frequency slots are assigned to a first group having a high priority than to a second group having a low priority.

* * * * *